United States Patent

Denner et al.

[15] 3,666,121
[45] May 30, 1972

[54] TRAILER HITCH

[72] Inventors: David L. Denner; Herbert E. Warner, both of Toledo, Ohio

[73] Assignee: Overhead Door Corporation, Dallas, Tex.

[22] Filed: May 28, 1970

[21] Appl. No.: 41,507

[52] U.S. Cl. .......................... 214/77 P, 280/400, 280/491 D
[51] Int. Cl. ..................................................... B60d 1/00
[58] Field of Search .................. 280/491 D, 491 R; 214/77 P

[56] References Cited

UNITED STATES PATENTS

| | | | |
|---|---|---|---|
| 3,474,921 | 10/1969 | Rossoni | 214/77 P |
| 3,113,684 | 12/1963 | Novotney | 214/77 P |
| 2,995,386 | 8/1961 | Peterson | 280/491 D |
| 3,528,573 | 9/1970 | Denner | 214/77 P |

*Primary Examiner*—Leo Friaglia
*Attorney*—Woodhams, Blanchard and Flynn

[57] ABSTRACT

A trailer hitch comprising two arms pivotally supported upon the mounting means by which a lift mechanism is supported upon a vehicle. The arms are movable between substantially parallel positions adjacent the mounting means, where they do not interfere with the upward and downward movement of the lift mechanism, and extended positions in which their free ends are interconnected, one of said arms supports a hitch ball and both said arms include means whereby the same pin can hold the arms in either the extended positions or the retracted positions.

10 Claims, 7 Drawing Figures

INVENTORS
DAVID L. DENNER
HERBERT E. WARNER
BY Woodhams, Blanchard & Flynn
ATTORNEYS

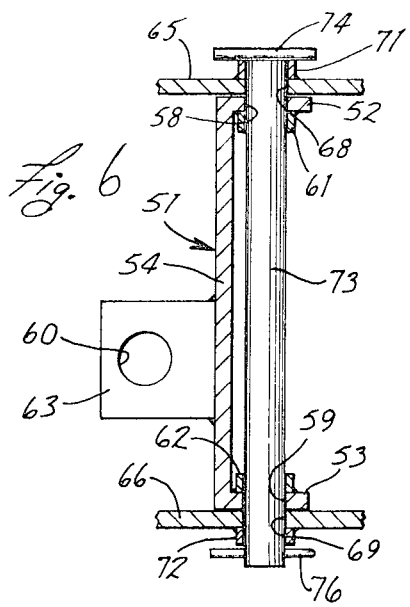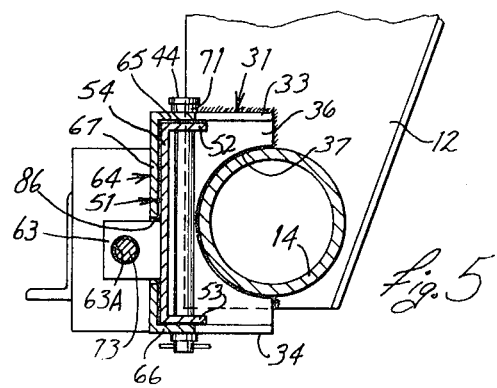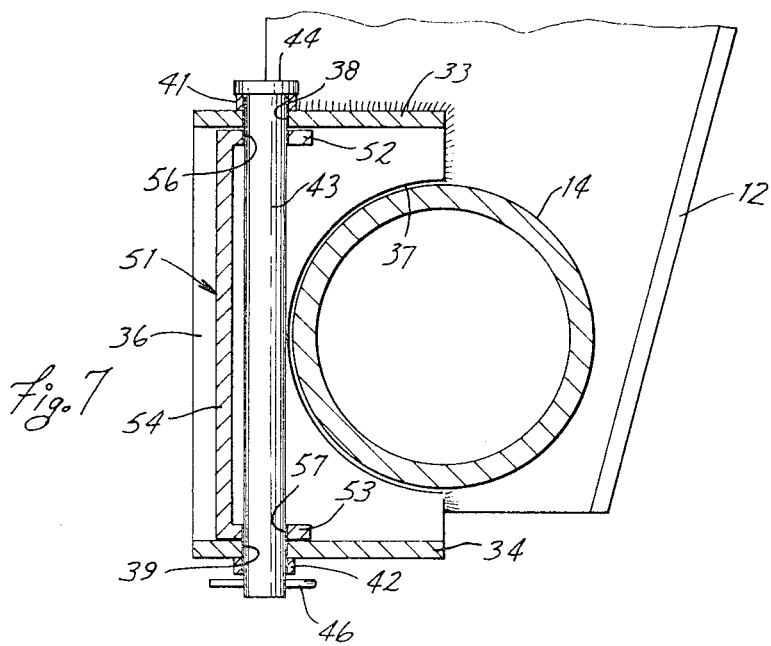

3,666,121

TRAILER HITCH

BACKGROUND OF THE INVENTION

This invention relates in general to a trailer hitch and, more particularly, to a type thereof especially designed for mounting on the base means secured to the chasis or frame of a truck for supporting a power-operated lift mechanism.

As it has become more advantageous for individual householders and small business owners to move their own goods or products, there has been an increased demand for the most modern equipment on a rental basis for performing such work. By way of example, it is now commonplace to rent trucks having pressure fluid actuated lift mechanisms, such as lift gates mounted on the rear end of the truck bed, for facilitating the loading and unloading of the truck. However, it is also desirable to provide the same truck with some form of hitch to which a conventional trailer can be connected. That is, the renter of the truck with the lift mechanism frequently wishes to pull a trailer, such as a conventional house trailer, a boat trailer, or even a trailer carrying additional merchandise or household goods. Yet this truck operator does not want to sacrifice the availability of the lift mechanism in order to have an easily operable and usable trailer hitch which is not presently available in combination with such a lift mechanism. One form of existing trailer hitch broadly for this purpose is shown in the Rossoni U.S. Pat. No. 3,474,921, which is owned by the Assignee of this application.

Obviously, the Rossoni hitch is not immediately adaptable for use with the usual type of trailer coupling conventionally found on travel trailers, boat trailers and the like. It can be adapted by men who are accustomed to working with this type of equipment for connection to a conventional trailer hitch, provided that a suitable adapter is furnished. However, the Rossoni type of hitch simply is not adapted for use by the householder or small business owner who wishes to use a truck of this type once or twice a year at the most and who does not wish to or may not be able to cope with the problems of obtaining and mounting an adapter.

A trailer hitch mounted upon a truck having a lift mechanism creates a further problem which must be avoided. That is, if the trailer hitch on the truck extends rearwardly to a point where it is conveniently accessible for connecting to the tongue on the trailer, then it frequently, if not usually, interferes with the raising and lowering movements of the lift mechanism. Where the lift platform is folded upon the linkage so that it can be stowed beneath the rear end of the truck bed, when not in use, the problem of interference between the lift mechanism and the trailer hitch is virtually insurmountable under existing teachings. A lift mechanism of this type is disclosed in the McCarty U.S. Pat. No. 3,138,270 which is owned by the Assignee of this application.

In addition to the foregoing, it has become apparent that trailer hitches must be secured, particularly where the load connected thereto is substantial, to a portion of the truck frame or chasis, either directly or indirectly, where there will be no question of failure. Moreover, the trailer hitch must be fabricated in a manner so t-at it will not fail under heavy loads.

In reviewing the foregoing problems and noting the lack of any existing solution for such problems, it occurred to us that lift mechanisms are and must be rigidly anchored and mounted upon a truck bed in order to perform their task. Frequently, this mounting and anchoring is achieved through an elongated member, such as a trunnion, which is rigidly secured in a horizontal position below the rear end of the truck bed where it is rigidly secured to the truck bed by suitable bracket means. This elongated member or trunnion provides the means by which the linkage is mounted to the truck for the purpose of raising and lowering the lift platform. Obviously, its mounting is secure and trustworthy so that it furnishes an excellent base for support of a trailer hitch.

It then became apparent that such a trailer hitch would have to be capable of movement with a minimum of difficulty between an extended position for easy engagement by the tongue of a trailer in a conventional manner and a retracted position incapable of interference with the lift mechanism either during its upward and downward movement or, where such applies, during the movement of its platform into a stowed position beneath the truck bed. Further, the movement the trailer hitch into and out of its operable position must be so simple and fool-proof that it can be handled by persons who normally have nothing whatsoever to do with a truck.

Moreover, the trailer hitch must be constructed so that it is completely safe in operation and, therefore will not become disengaged during such operation.

Accordingly, a primary object of this invention is the provision of a trailer hitch for a vehicle wherein the vehicle is equipped with a pressure fluid actuated lift mechanism supported upon the rear end of the vehicle in the region where the trailer hitch is to be mounted and wherein said trailer hitch is capable of quick and easy connection to a conventional tongue of a travel trailer, boat trailer or the like.

A further object of this invention is the provision of a trailer hitch which can be securely attached to the bed of a truck by mounting said hitch upon the base of a lift mechanism, which base is rigidly secured to the truck bed, and wherein the trailer hitch can be moved between an extended position for connection to the tongue of a trailer and a retracted position where it will not interfere in any way with the normal operation of the lift mechanism, regardless of whether it is the type of lift mechanism in which the platform becomes the tailgate of the truck bed or in which the platform folds under the rear end of the bed into a stowed position.

Other objects and purposes of this invention will become apparent to persons familiar with this type of equipment upon reading the following specification and examining the accompanying drawings in which:

FIG. 5 is a sectional view taken along the line V-V in FIG. 4.

FIG. 6 is a sectional view taken along the line VI-VI in FIG. 3.

FIG. 7 is a sectional view taken along the line VII-VII in FIG. 4.

Figures 1, 2:
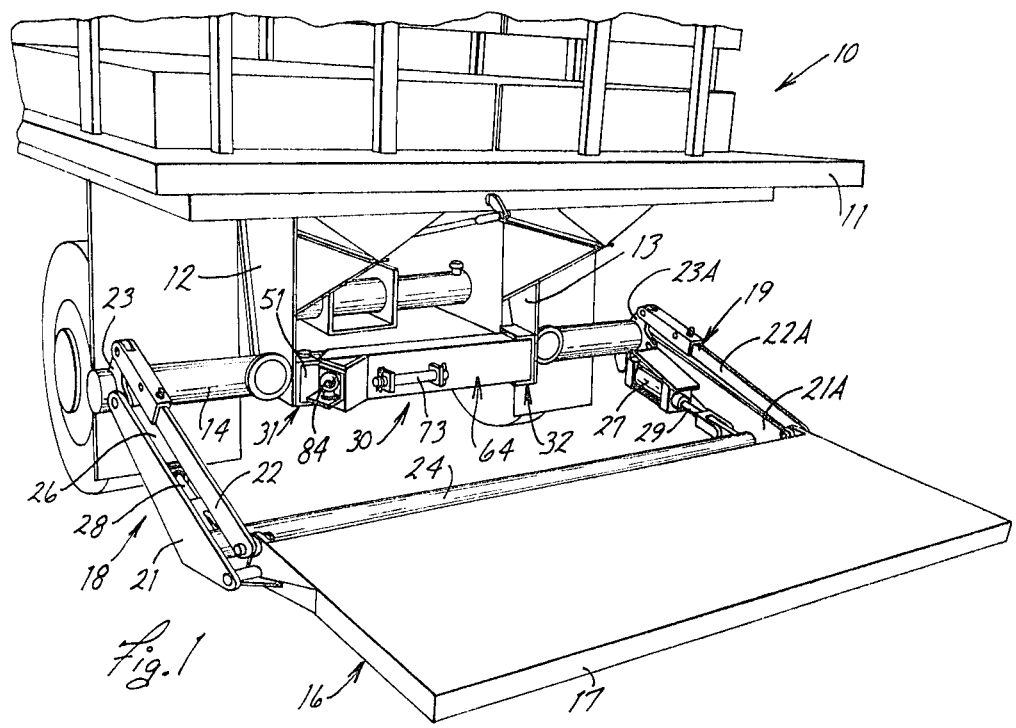
FIG. 1 is a perspective vie of a portion of the rear end of a truck having a lift mechanism and a trailer hitch mounted upon the base for the lift mechanism.
FIG. 2 is a fragment of FIG. 1 showing the lift mechanism in the stowed position and the trailer hitch in the extended position.

For convenience in description, the terms "upper," "lower," "left," "right," "front" and "rear" will have reference to the trailer hitch of the invention and parts associated therewith as appearing in FIG. 1 wherein the rearward end of the truck is shown. The terms "inner," "outer" and derivatives thereof will gave reference to the geometric center of said trailer hitch and parts associated therewith.

SUMMARY OF THE INVENTION

The objects and purposes of the invention are met by providing a trailer hitch for a truck having a load lifting device pivotally mounted on the rear end thereof for movement between raised and lowered positions. Mounting means are provided at the rear end of the truck and are adapted to pivotally support the lifting device. A pair of hitch arms are each pivotally connected at one end to the mounting means about spaced upright axes. At least one of the arms is channel-shaped and the other arm is disposed within the channel-shaped arm when the arms are in retracted positions substantially parallel with each other. Connector means is provided on one of the arms for engagement with a trailer tongue. Lock means releasably connect the arms to each other near the free ends thereof when the arms are at substantial angles to their retracted positions.

DETAILED DESCRIPTION

The rear end of a truck 10 (FIG. 1) has a generally horizontal truck bed 11 to which are secured a pair of downwardly extending, spaced brackets 12 and 13. A horizontal trunnion 14 is fixedly secured to the brackets 12 and 13 and extends transversely of the truck bed 11 beyond the brackets 12 and 13.

A foldable load lifting apparatus 16 comprises a platform 17 which is connected to the trunnion 14 through a pair of horizontally and laterally spaced linkage systems 18 and 19. The linkage system 18 comprises a compression link 21 pivotally secured at one end to the left end of the trunnion 14 and pivotally secured at the opposite end to the respective lower front edge of the platform 17. The linkage system 18 also comprises an articulated, two-piece tension link 22 which is pivotally secured at one end to a bracket 23 fixedly secured to the left end of the trunnion 14 and pivotally secured at the opposite end to the respective upper front edge of the platform 17. The linkage system 19 is a mirror image of the linkage system 18 in this embodiment. Thus, the corresponding components thereof will be designated by the same reference numerals designating corresponding parts of the linkage system 18, but with the suffix "A" added thereto.

A lift bar 24 is fixedly secured to and extends between the compression links 21 and 21A. A pair of hydraulically operated power cylinders 26 and 27 are secured to opposite ends of the trunnion 14 adjacent the linkage systems 17 and 18, respectively. The actuating rods 28 and 29 of the power cylinders 26 and 27, respectively, are each connected to opposite ends of the bar 24.

The foregoing described structure relating to the foldable load lifting apparatus 16 may be generally identical to the structure set forth in the aforementioned McCarty U.S. Pat. No. 3,138,270 and, therefore, not further detailing is believed necessary. If desired, however, a lifting device, such as is disclosed in Rossoni U.S. Pat. No. 3,474,921, can be utilized on the rear end of the truck in place of the above-described structure.

A hitch assembly 30 (FIG. 3), embodying the invention, comprise a pair of C-shaped supports 31 and 32 which are secured, as by welding, to the brackets 12 and 13, respectively. The support 31 has a pair of vertically spaced, parallel legs 33 and 34 interconnected by a generally vertical web 36. The web 36 (FIG. 5) has a semicircular notch 37 to permit a portion of the trunnion 14 to extend between the legs 33 and 34.

Axially aligned openings 38 and 39 (FIG. 7) are provided in the legs 33 and 34, respectively. A circular sleeve 41 is secured to the upper surface of the leg 33 and encircles the opening 38 therein. The inner diameter of the sleeve 41 is preferably equal to the diameter of the opening 38. A circular sleeve 42 is secured to the lower surface of the leg 34 and encircles the opening 39 therein. The inner diameter of the sleeve 41 is preferably equal to the diameter of the opening 39. A pin 43 is adapted to be received through the axially aligned openings 38 and 39 and the sleeves 41 and 42. An enlarged head 44 on the pin 43 prevents same from falling downwardly through the sleeves 41 and 42 openings 38 and 39. A spring clip 46 or the like may be attached to the lower end of the pin 43 to prevent accidental upward movement thereof.

The hitch assembly 30 further includes a channel-shaped arm 51 (FIGS. 3 and 7) which has a pair of vertically spaced and generally horizontal flanges 52 and 53 interconnected by a generally vertical side plate 54. Axially aligned openings 56 and 57 are provided through adjacent ends of the flanges 52 and 53, respectively, and are adapted to receive the pin 43 to pivotally support the arm 51 with respect to the bracket 31. The vertical spacing between the flanges 52 and 53 is slightly less than the vertical spacing between the legs 33 and 34 of the support 31 to permit free movement of the support 31 between the legs 33 and 34 as shown in FIG. 7.

Axially aligned openings 58 and 59 (FIG. 6) are provided in the flanges 52 and 53 of the arm 51 adjacent the free end thereof. A circular sleeve 61 is secured to the underside of the flange 52 and encircles the opening 58. The internal diameter of the sleeve 61 is preferably identical to the diameter of the opening 58. A circular sleeve 62 is secured to the upper surface of the leg 53 and has an internal diameter preferably equal to the diameter of the opening 59. A lug 63 is secured to and projects from the side plate 54 of the arm 51. The lug 63 has an opening 60 therethrough.

The support 32 may be, and preferably is, identical to the support 31 and, therefore, portions of the support 32 will be referred to by the reference numerals designating corresponding portions of the support 31, but with the suffix "A" added thereto.

The spacing between the legs 33A and 34A is greater than the spacing between the legs 33 and 34 of the support bracket 31. The web 36A is provided with a notch (not illustrated) which permits a portion of the trunnion 14 to extend between the legs 33A and 34A. A pin 43A having and enlarged head 44A is received through openings provided in the legs 33A and 34A.

Figure 4:
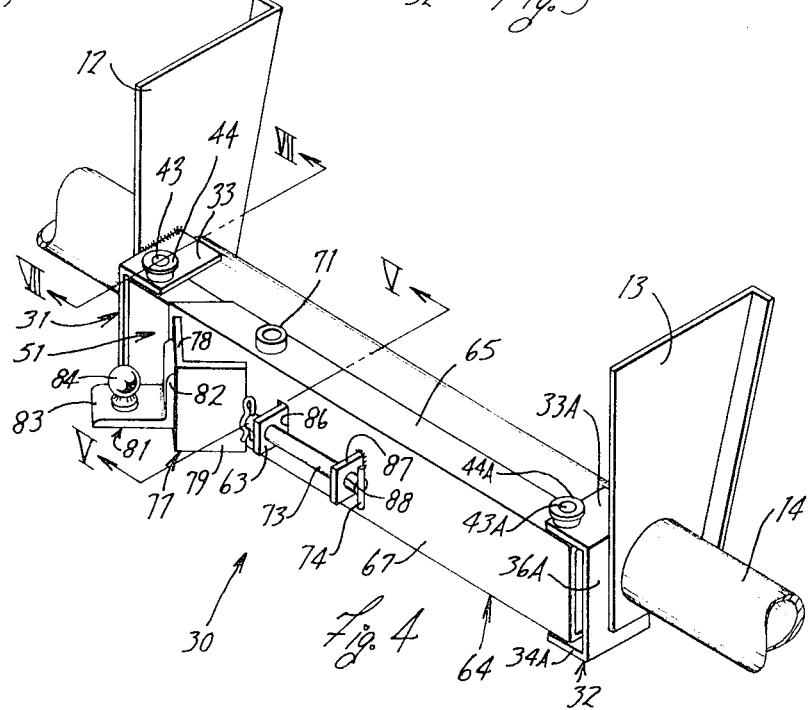
FIG. 4 is a perspective view of the portion of the lift mechanism shown in FIG. 3 with the trailer hitch in the retracted position.

A channel-shaped arm 64 (FIG. 5) has a pair of vertically spaced and generally horizontal flanges 65 and 66 interconnected by a side plate 67. The vertical spacing between the flanges 65 and 66 is slightly greater than the vertical spacing between the flanges 52 and 53 of the arm 51 to permit the flanges 65 and 66 to overlap the flanges 52 and 53 when the arms 51 and 64 are in their generally parallel, retracted positions adjacent to each other, as illustrated in FIGS. 4 and 5.

The vertical spacing between the flanges 65 and 66 is slightly less than the vertical spacing between the legs 33A and 34A of the bracket 32 so that the legs 33A and 34A will overlap the flanges 65 and 66 of the arm 64. A pair of axially aligned openings (not shown) are provided in the flanges 65 and 66 in the same manner as the axially aligned openings 56 and 57 in the arm 51. The pin 43A is received in these openings of arm 64 to pivotally mount the arm 64 upon the support 32.

Axially aligned openings 68 and 69 (FIG. 6) are provided in the flanges 65 and 66 adjacent the free ends thereof. The horizontal spacing between the mutual axis of openings 68, 69 and the pin 43A is preferably identical to the spacing between the mutual axis of openings 58, 59 in the flanges 52 and 53, respectively, and the pin 43. Thus, in this embodiment, the openings 58, 59 and 68, 69 will be axially aligned when the arms 51 and 64 are both at angles of approximately 45° to the trunnion 14. However, other angular relationships may be used satisfactorily.

A sleeve 71 (FIG. 6) is secured to the upper surface of the flange 65. The inner diameter of the sleeve 71 is preferably equal to the diameter of the opening 68. A sleeve 72 is secured to the lower surface of the flange 66 and encircles the opening 69. The internal diameter of the sleeve 72 is preferably equal to the diameter of the opening 69.

A pin 73 is adapted to be received through the openings 58, 59 and 68, 69 when they are in the aforementioned axially aligned positions. A cross bar 74 is secured to the upper end of the pin 73 to limit the downward movement of the pin 73 through the openings 58, 59 and 68, 69. A spring clip 76 is adapted to engage the lower end of the pin 73 to prevent an inadvertent upward movement of the pin 73.

An L-shaped bracket 77 (FIGS. 2, 3 and 4) has legs 78 and 79, the free edges of which are secured along vertical lines to the outer surface of the side plate 67 of the arm 64 near the free end thereof. An L-shaped support 81 has flanges 82 and 83, the flange 82 being secured to the rearwardly facing leg 78 of the bracket 77, as by welding. The flange 83 is preferably horizontal and has a hitch ball 84 secured to the upper surface thereof.

An opening 86 is provided in the side plate 67 of the arm 64 and is preferably horizontally aligned with the lug 63 on the arm 51. Moreover, the lug 63 and opening 86 are so positioned upon their respective arms 51 and 64 that the lug 63 will be received through the opening 86, as illustrated in FIGS. 4 and 5, when the arms 51 and 64 are moved into their retracted positions. A lug 87 is secured to the side plate 67 of the arm 64 between the pin 43A and the opening 86. The lug 87 has an opening 88 therethrough which can be horizontally aligned with the opening 60 in the lug 63.

Figure 3:
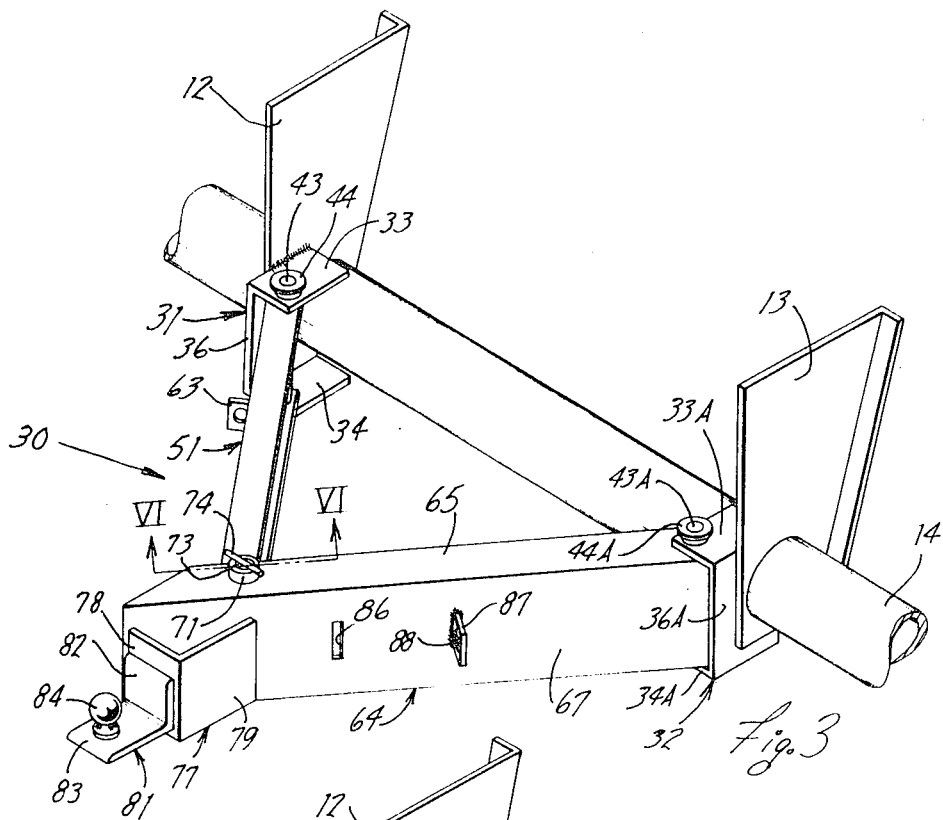
FIG. 3 is a perspective view of a portion of the lift mechanism with the trailer hitch in the extended position.

The lug 87 is preferably located so that when the arms 51 and 64 are retracted, the pin 73 (that is, the same pin which locks the arms 51 and 64 in the extended position of FIGS. 2 and 3) can be received through the openings 60 and 88 (FIGS. 4 and 5) to lock the arms in their retracted positions. The cross bar 74 on one end of the pin 73 limits movement of the pin 73 in one direction relative to the lugs 63 and 87. The spring clip 76 is adapted to limit movement of the pin 73 in the other direction relative to the lugs 63 and 87.

OPERATION

Although the operation of the hitch assembly 30 described above will be understood from the foregoing description by skilled persons, a summary of such description is now given for convenience.

When the lift assembly is in the stowed position, such as is illustrated in FIG. 2, the hitch assembly 30 may be moved from the retracted position illustrated in FIGS. 1 and 4 to the extended position illustrated in FIGS. 2 and 3. More particularly, the spring clip 76 may be removed from engagement with the pin 73 so that the pin 73 can be removed from the openings 60 and 88 in the lugs 63 and 87, respectively. The arms 51 and 64 may then be swung about the axes of the pins 43 and 43A, respectively, to the positions illustrated in FIGS. 2 and 3 until the openings 58, 59 and 68, 69 are axially aligned. The pin 73 is then inserted into said openings to lock the outer ends of the arms 51 and 64 together. The spring clip 76 may then be secured to the lower end of the pin 73.

When the arms 51 and 64 are secured together, as set forth above, the hitch ball 84 can be easily reached due to the fact that it will be spaced substantially rearwardly from the trunnion 14. Thus, it will not be necessary for the operator to move or reach beneath the bed of the truck 11 to connect a trailer tongue to the hitch ball 84.

The hitch assembly can be moved from the extended position, illustrated in FIGS. 2 and 3, to the retracted position illustrated in FIGS. 1 and 4 by reversing the procedure set forth above.

Although a particular preferred embodiment of the invention has been disclosed in detail for illustrative purposes, it will be understood that variations or modifications of the disclosed apparatus, including the rearrangement of parts, lie within the scope of the present invention.

The embodiments of the invention in which an exclusive property or privilege is claimed are defined as follows:

1. A trailer hitch in combination with a load lifting device adapted to be pivotally mounted on the rear end of a truck for movement between raised and grounded positions, comprising:

elongated mounting means adapted to be secured to the rear end of said truck, said lifting device being pivotally connected to said mounting means;
   a pair of hitch arm means supported near one end of each upon said mounting means for pivotal movement about spaced upright axes, one of said arm means being channel-shaped and the other arm means being adapted to nest within said channel-shaped arm means when said arm means are in a storage position wherein they are substantially parallel with the pivot axis of said lifting device on said mounting means;
   connector means on said arm means engageable by a trailer; and
   lock means for releasably connecting said arm means to each other near the other ends thereof when said arm means are in a use position wherein they are disposed at substantial angles to said pivot axis.

2. A trailer hitch according to claim 1, wherein said lock means includes a removable locking pin coacting between said pair of arm means for fixedly interconnecting said arm means in either said storage position or said use position, said locking pin in a first position fixedly connecting said pair of arm means in said storage position for preventing movement of said arm means away from said storage position, said locking pin in a second position fixedly connecting said pair of arm means in said use position.

3. A trailer hitch according to claim 2, wherein said pair of arm means includes first coacting recess means disposed in aligned relationship and adapted to receive therein said locking pin when said pair of arm means are in said use position, said pair of arm means also including second coacting recess means disposed in aligned relationship and adapted to receive said locking pin therein when said pair of arm means is in said storage position.

4. A trailer hitch according to claim 1 wherein said mounting means is an elongated tubular member;
   wherein said load lifting device includes spaced, parallel linkage means pivotally mounted at one end of each upon said tubular member at positions on opposite sides of said hitch arm means; and
   wherein both of said hitch arm means are channel-shaped, said connector means being a ball supported upon said other end of the first mentioned, channel-shaped arm means.

5. A trailer hitch according to claim 4, wherein each of said channel-shaped arm means, when in the storage position, open in a direction toward said elongated tubular member for permitting said arm means to be stored directly adjacent and extending longitudinally of said tubular member.

6. A trailer hitch according to claim 1, wherein each of said arm means is mounted solely for pivotal movement within a single plane which is substantially horizontal, said pair of arm means when in said use position coacting with said elongated mounting means for defining a substantially triangular configuration, the apex of said triangular configuration being defined by the interconnection of the free ends of said pair of arm means by said locking means, and said connecting means being mounted adjacent the apex of said triangular configuration.

7. In combination with a load lifting device adapted to be mounted upon the rear end of a truck beneath the deck thereof for pivotal movement around a horizontal axis between a grounded position and a position adjacent said deck, said lifting device having a mounting means adapted to be secured to said truck and spaced lift members connected to said mounting means for movement around said horizontal axis, a trailer hitch comprising:

a pair of elongated hitch arms, one of said arms being channel-shaped and the other arm being adapted for nesting within said one arm when said hitch arms are disposed in a storage position wherein they are substantially parallel with and near to said horizontal axis;
   hinge means disposed between said lift members and coacting between one end of each hitch arm and said mounting means for permitting said arms to be solely swingably moved within a single plane which is substantially horizontal, said hinge means mounting said one ends of said arms for pivotal movement about spaced, parallel and vertical axes positioned adjacent said horizontal axis, said arms being swingable in opposite rotational directions about said axes as they are being moved from said storage position into a use position;
   connector means on one of said hitch arms; and
   lock means adapted to secure the other ends of said hitch arms together when said arms are in said use position wherein they are at substantial angles to said horizontal axis.

8. In combination with a load lifting device adapted to be mounted upon the rear end of a truck beneath the deck thereof for pivotal movement around a horizontal axis between a grounded position and a position adjacent said deck, said lifting device having mounting means adapted to be secured to said truck and spaced lift members connected to said mounting means for movement around said horizontal axis, a trailer hitch comprising:
- a pair of elongated hitch arms adapted to be disposed directly adjacent one another in side-by-side relationship when said hitch arms are disposed in a storage position wherein they are substantially parallel with and positioned closely adjacent to said horizontal axis;
- hinge means disposed between said lift members and coacting between one end of each hitch arm and said mounting means for permitting said arms to be solely swingably moved within a single plane which is substantially horizontal, said hinge means mounting said one ends of said arms for pivotal movement about spaced, parallel and vertical axes positioned adjacent said horizontal axis, said arms being swingable in opposite rotational directions about said axes as they are being moved from said storage position into a use position wherein the arms extend at substantial angles to said horizontal axis;
- connector means for a trailer on one of said hitch arms;
- lock means coacting directly between said pair of hitch arms for permitting said hitch arms to be selectively fixedly interconnected in either said use position or said storage position, said lock means including a single lock pin disposed for coaction with said pair of arms when in either said storage position or said use position for fixedly interconnecting same;
- said pair of arms including a first pair of cooperating recess means therein and disposed in substantially aligned relationship when said arms are in said use position, whereby the aligned first pair of recess means receive therein said lock pin for fixedly interconnecting said arms in said use position, said first pair of recess means being disposed adjacent the other ends of said arms; and
- said pair of arms also including a second pair of cooperating recess means therein and disposed in substantially aligned relationship when said arms are in said storage position for enabling said lock pin to be disposed within said second pair of recess means for fixedly interconnecting said pair of arms in said storage position.

9. The combination of claim 8, wherein said pair of arms each has a projecting flange containing a recess therein, said pair of flanges being substantially aligned and parallel with one another when said arms are in said storage position to permit said locking pin to be inserted through and supported on said flanges.

10. The combination of claim 9, wherein one of the arms has an opening therein through which extends the flange of said other arm, whereby positioning of said locking pin within the recesses defined by said flanges positively prevents relative pivotal movement of said arms.

* * * * *